US012594875B2

(12) United States Patent
Yamasaki et al.

(10) Patent No.: US 12,594,875 B2
(45) Date of Patent: Apr. 7, 2026

(54) VEHICLE WITH ROAD SURFACE IMAGE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/431,651

(22) Filed: Feb. 2, 2024

(65) Prior Publication Data

US 2024/0270157 A1      Aug. 15, 2024

(30) Foreign Application Priority Data

Feb. 14, 2023    (JP) ................................. 2023-021181

(51) Int. Cl.
| | |
|---|---|
| *B60Q 1/14* | (2006.01) |
| *B60Q 1/08* | (2006.01) |
| *B60Q 1/50* | (2006.01) |
| *B60W 50/14* | (2020.01) |
| *G06V 20/58* | (2022.01) |

(52) U.S. Cl.
CPC ............ *B60Q 1/143* (2013.01); *B60Q 1/085* (2013.01); *B60Q 1/50* (2013.01); *B60Q 1/525* (2013.01); *B60W 50/14* (2013.01); *G06V 20/58* (2022.01); *B60Q 2400/50* (2013.01); *B60W 2050/146* (2013.01); *B60W 2420/403*

(2013.01); *B60W 2554/402* (2020.02); *B60W 2554/4026* (2020.02); *B60W 2554/4029* (2020.02); *B60W 2554/4041* (2020.02)

(58) Field of Classification Search
CPC ......... B60Q 1/143; B60Q 1/525; G06V 20/58
See application file for complete search history.

(56) References Cited

U.S. PATENT DOCUMENTS

| | | | |
|---|---|---|---|
| 10,134,283 B2 | 11/2018 | Masuda et al. | |
| 10,737,611 B2 * | 8/2020 | Haneda ..................... | B60Q 1/44 |
| 12,307,899 B2 * | 5/2025 | Jiang ...................... | B60Q 1/535 |

(Continued)

FOREIGN PATENT DOCUMENTS

| | | |
|---|---|---|
| JP | 2015-164828 A | 9/2015 |
| JP | 2016-055691 A | 4/2016 |
| JP | 2020-111284 A | 7/2020 |

*Primary Examiner* — William N Harris
(74) *Attorney, Agent, or Firm* — Rimon P.C.

(57) ABSTRACT

A vehicle with a road surface image rendering function includes a light projection member, a controller, and a detection device. The light projection member is configured to project light for road surface image rendering toward a road surface in front of the vehicle. The controller is configured to control light projection for of road surface image rendering. The detection device is configured to detect a pedestrian or a bicycle on a road shoulder in front of the vehicle on the road surface where a road surface image is rendered. The controller is configured to, when the pedestrian or the bicycle on the road shoulder in front of the vehicle is detected, change the light projection for the road surface image rendering by the light projection member so as to promote visual recognition of the pedestrian or the bicycle on the road shoulder in front of the vehicle.

6 Claims, 8 Drawing Sheets

(56)  References Cited

U.S. PATENT DOCUMENTS

| | | | |
|---|---|---|---|
| 2014/0062685 A1* | 3/2014 | Tamatsu | G08G 1/005 |
| | | | 340/425.5 |
| 2016/0161076 A1* | 6/2016 | Shibata | F21S 41/26 |
| | | | 362/543 |
| 2017/0203685 A1* | 7/2017 | Hirai | B60Q 1/0023 |
| 2018/0118095 A1* | 5/2018 | Kunii | B60Q 1/085 |
| 2018/0257547 A1* | 9/2018 | Suzuki | B60Q 1/547 |
| 2018/0257548 A1* | 9/2018 | Suzuki | B60Q 1/04 |
| 2018/0257549 A1* | 9/2018 | Suzuki | B60Q 1/04 |
| 2018/0257550 A1* | 9/2018 | Suzuki | B60Q 1/545 |
| 2018/0260182 A1* | 9/2018 | Suzuki | B60Q 1/547 |
| 2018/0261081 A1* | 9/2018 | Suzuki | B60Q 1/525 |
| 2019/0078877 A1* | 3/2019 | Suzuki | G01B 11/303 |
| 2021/0271249 A1* | 9/2021 | Kobashi | G06V 20/58 |
| 2022/0390251 A1* | 12/2022 | Suzuki | B60Q 1/34 |
| 2023/0398926 A1* | 12/2023 | Kim | B60Q 1/525 |

* cited by examiner

VEHICLE WITH ROAD SURFACE IMAGE RENDERING FUNCTION

CROSS-REFERENCE TO RELATED APPLICATIONS

The present application claims priority from Japanese Patent Application No. 2023-021181 filed on Feb. 14, 2023, the entire contents of which are hereby incorporated by reference.

BACKGROUND

The disclosure relates to a vehicle with a road surface image rendering function.

Japanese Unexamined Patent Application Publication (JP-A) Nos. 2016-055691, 2020-111284, and 2015-164828 disclose that, by projecting light from a vehicle, various patterns are rendered on a road surface on which the vehicle is traveling.

By rendering such patterns on the road surface, the vehicle can provide information related to its traveling, etc. to the driver who is driving the vehicle and to others through the road surface.

SUMMARY

An aspect of the disclosure provides a vehicle with a road surface image rendering function. The vehicle includes a light projection member, a controller, and a detection device. The light projection member is configured to project light for road surface image rendering toward a road surface in front of the vehicle. The controller is configured to control light projection for the road surface image rendering by the light projection member. The detection device is configured to detect a pedestrian or a bicycle on a road shoulder in front of the vehicle on the road surface a road surface image is rendered by the light projection member. The controller is configured to, when the pedestrian or the bicycle on the road shoulder in front of the vehicle is detected by the detection device, change the light projection for the road surface image rendering by the light projection member so as to promote visual recognition of the pedestrian or the bicycle on the road shoulder in front of the vehicle.

An aspect of the disclosure provides a vehicle with a road surface image rendering function. The vehicle includes a light projection member, circuitry, and a detection device. The light projection member includes a light source and is configured to project light for road surface image rendering toward a road surface in front of the vehicle. The circuitry is configured to control light projection for the road surface image rendering by the light projection member. The detection device includes a sensor and is configured to detect a pedestrian or a bicycle on a road shoulder in front of the vehicle on the road surface where a road surface image is rendered by the light projection member. The circuitry is configured to, when the pedestrian or the bicycle on the road shoulder in front of the vehicle is detected by the detection device, change the light projection for the road surface image rendering by the light projection member so as to promote visual recognition of the pedestrian or the bicycle on the road shoulder in front of the vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Road surface images rendered on the road surface by light projection from a vehicle as described above are not necessarily easily visually recognizable by the driver of the vehicle or by others.

On the road where the vehicle is traveling, there may be pedestrians and bicycles as well as preceding vehicles and oncoming vehicles. Furthermore, pedestrians and bicycles are often on the road shoulder of the road rather than in the lanes of the road. It may be necessary for the driver of the vehicle to pay more conscious attention to pedestrians and bicycles on the road shoulder of the road than to preceding and oncoming vehicles. Especially at night, pedestrians and bicycles on the road shoulder of the road may be difficult for the driver of the vehicle to see.

In such a traveling environment, if the vehicle renders road surface images on the road surface as usual, the driver of the vehicle may become easily distracted by the road surface images which are brightly rendered on the road surface. As a result, the driver of the vehicle may pay attention to possible preceding vehicles, oncoming vehicles, and the road surface images, which are easily recognizable, but may lack conscious attention to other things, such as pedestrians and bicycles on the road shoulder of the road.

As described above, there is a demand for improved road surface image rendering from the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
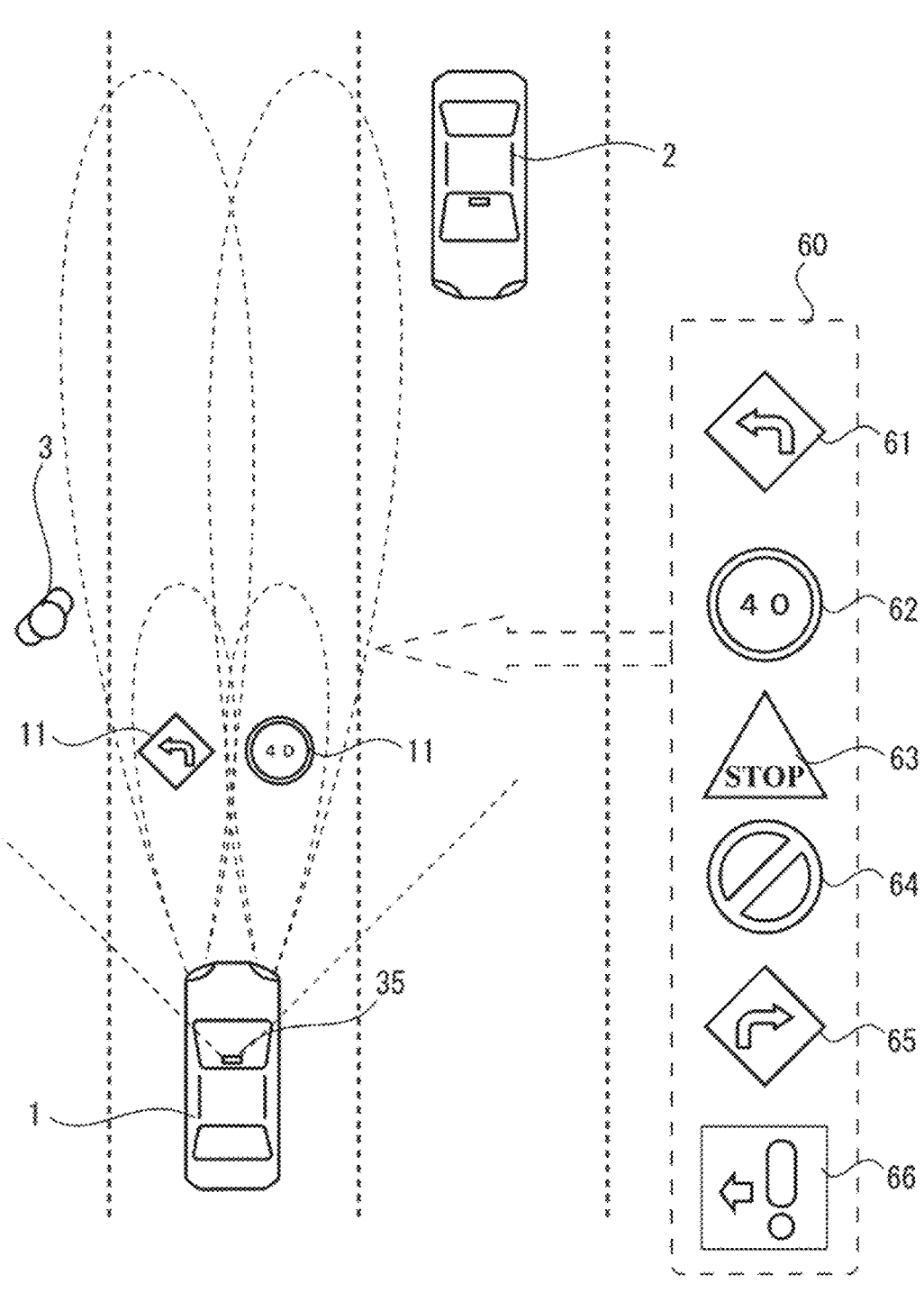
FIG. 1 is a descriptive diagram of an example of a traveling state of a vehicle according to an embodiment of the disclosure.

FIG. 1 is a descriptive diagram of an example of a traveling state of a vehicle 1 such as an automobile according to a first embodiment of the disclosure.

FIG. 1 illustrates the vehicle 1, which travels on a single-lane road. The automobile is an example of the vehicle 1. Other examples of the vehicle 1 include buses, trucks, motor cycles, personal mobility devices, and the like. Note that the vehicle 1 may be capable of traveling by autonomous driving including drive assistance.

An oncoming vehicle 2 is traveling in the oncoming lane of the road. There is also a pedestrian 3 on the road shoulder. In such a traveling environment, the driver who is driving the vehicle 1 operates the vehicle 1 to travel so as not to deviate from the lane of the road while paying attention to the front side, which is the direction of travel of the vehicle 1, for example.

In addition, if the traveling environment is dark at night, the vehicle 1 turns on the headlamps. In FIG. 1, the illumination range of the headlamps in the low beam and the illumination range of the headlamps in the high beam are represented by dashed lines.

Also illustrated on the right side of FIG. 1 are light projection patterns 60 serving as the basis for road surface images 11. Here, the following are exemplified: a left-turn indicator light projection pattern 61, a speed-limit light projection pattern 62, a light projection pattern 63 for indicating the stop position, a light projection pattern 64 for indicating no crossing, a right-turn indicator light projection pattern 65, and a light projection pattern 66 with a pictogram to alert that there is a pedestrian or a bicycle on the road shoulder. The vehicle 1 may select one or more light projection patterns from among these light projection patterns 60 according to the traveling state and the traveling environment, and execute light projection corresponding to the selected light projection pattern(s).

By rendering patterns such as the road surface images 11 on the road surface, the vehicle 1 can provide information related to the traveling of the vehicle 1 to the driver and to others through the road surface.

Figure 2:
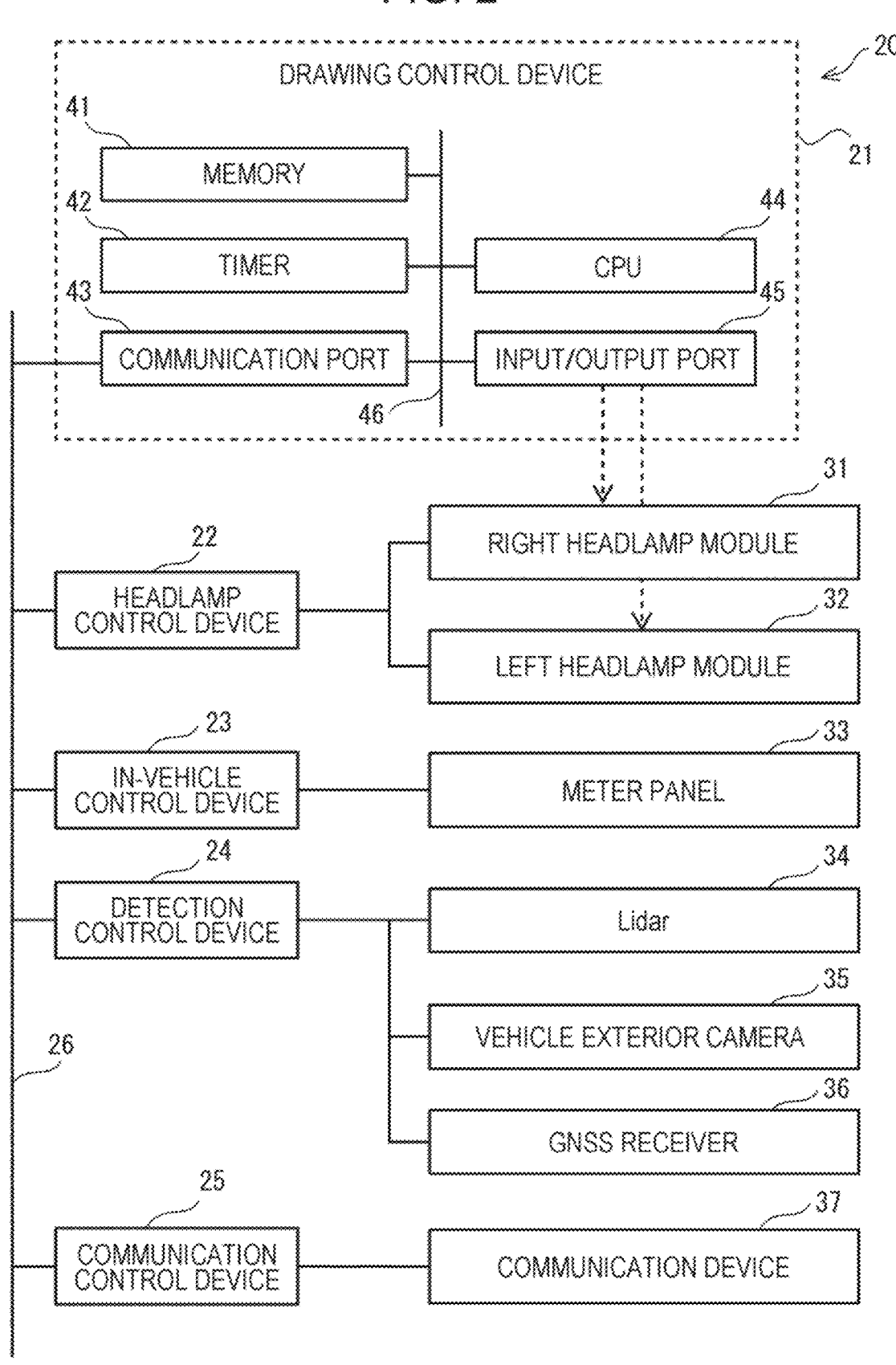
FIG. 2 is a descriptive diagram of a control system provided in the vehicle illustrated in FIG. 1.

FIG. 2 is a descriptive diagram of a control system 20 provided in the vehicle 1 illustrated in FIG. 1.

The control system 20 of the vehicle 1 illustrated in FIG. 2 has control devices and a vehicle network 26 to which the control devices are connected.

The vehicle network 26 may be a wired communication network compliant with, for example, Controller Area Network (CAN) and Local Interconnect Network (LIN) for the vehicle 1. The vehicle network 26 may be a communication network, such as a local area network (LAN), or a combination of the foregoing networks. The vehicle network 26 may partially include a wireless communication network. Various devices described above that are connected to the vehicle network 26 can send and receive information to and from each other through the vehicle network 26.

Moreover, FIG. 2 illustrates examples of the control devices, including a rendering control device 21, a headlamp control device 22, an in-vehicle control device 23, a detection control device 24, and a communication control device 25. Other control devices, including a traveling control device and an air conditioning control device, may be connected to the vehicle network 26. Also, each control device illustrated in FIG. 2 may be divided into multiple portions and these multiple portions may be connected to the vehicle network 26.

A right headlamp module 31 and a left headlamp module 32 provided in a front end portion 50 of the vehicle 1 are connected to the headlamp control device 22. The right headlamp module 31 and the left headlamp module 32 are headlamp members configured to project light onto the front side of the vehicle 1.

Furthermore, the right headlamp module 31 and the left headlamp module 32 of the present embodiment each have a light projection module 53 for road surface image rendering, as will be described later. In the present embodiment, the light projection module 53 of the right headlamp module 31 and the light projection module 53 of the left headlamp module 32 each serve as a light projection member capable of projecting light for road surface image rendering toward the road surface at least in front of the vehicle 1. That is, the projection member may include a light source.

The headlamp control device 22 controls the illumination state of the right headlamp module 31 and the illumination state of the left headlamp module 32 in response to information of the operation of a non-illustrated lamp operating lever and information of the detected value of a non-illustrated light intensity sensor for auto-light, obtained through the vehicle network 26. In general, the operating states of low beam lighting, high beam lighting, and off can be set to the lamp operating lever.

The headlamp control device 22 may then output information of the illumination state of the right headlamp module 31 and the left headlamp module 32 to other control devices through the vehicle network 26.

Various in-vehicle components for occupants including the driver are connected to the in-vehicle control device 23. FIG. 2 illustrates a meter panel 33 as an example of an in-vehicle member. The meter panel 33 is provided in front of the driver, who is an occupant, in the cabin of the vehicle 1. The meter panel 33 may be, for example, a liquid crystal panel. The meter panel 33 is capable of displaying a tachometer, a speedometer, and other information, as described below.

The in-vehicle control device 23 may then obtain, through the vehicle network 26, various types of information to be displayed on the meter panel 33.

As described above, the meter panel 33 may serve as an information output device configured to output, in the vehicle 1, information to an occupant of the vehicle 1.

Various detection members for detecting the traveling state and the traveling environment of the vehicle 1 are connected to the detection control device 24. FIG. 2 illustrates a Lidar 34, a vehicle exterior camera 35, and a Global Navigation Satellite System (GNSS) receiver 36 as examples of detection members.

The detection control device 24 may then output detection information of the Lidar 34, etc. to other control devices through the vehicle network 26.

The Lidar 34 is provided in the front portion of the vehicle 1 and scans the front side, which is the direction of travel of the vehicle 1, with a laser to generate spatial information in front of the vehicle 1. The spatial information generated by the Lidar 34 may include the road surface of the road, the oncoming vehicle 2, the pedestrian 3, and the like.

The vehicle exterior camera 35 is provided facing forward in the cabin, which is inside the windshield of the vehicle 1, as illustrated in FIG. 1. The vehicle exterior camera 35 as such can capture images of the front side, which is the direction of travel of the vehicle 1. Note that the vehicle 1 may be provided with multiple vehicle exterior cameras 35. The multiple vehicle exterior cameras 35 may capture images of the surroundings of the vehicle 1 in a divided manner. Furthermore, the vehicle exterior camera 35 may be a 360-degree Camera or a stereo camera.

The vehicle exterior camera 35 captures images of the front side, which is the direction of travel of the vehicle 1. In this case, the images captured by the vehicle exterior camera 35 may include the road surface of the road, the oncoming vehicle 2, the pedestrian 3, and the like.

As described above, the vehicle exterior camera 35 and the Lidar 34 can serve as a detection device capable of detecting a pedestrian or a bicycle on the road shoulder in front of the vehicle 1, where a road surface image is rendered by each light projection member 53. That is, the detection device may include a sensor.

The GNSS receiver 36 receives radio waves from GNSS satellites to detect the location and time information of the vehicle 1 where the GNSS receiver 36 is provided.

A communication device 37 is connected to the communication control device 25. The communication device 37 sends and receives information to and from a server device through non-illustrated base stations and the like. The base stations may be, for example, base stations for 5G, Advanced Driver Assistance Systems (ADAS), or Intelligent Transport Systems (ITS). There are some base stations for 5G that can implement the functions of a server device. The communication device 37 may also communicate directly with other vehicles 1 and the like through Vehicle to X (V2X) communication.

The communication control device 25 may then send the information, obtained from the vehicle network 26, from the communication device 37 to a base station or a server device, or output the information, received by the communication device 37 from a base station or a server device, to the vehicle network 26.

The rendering control device 21 has a memory 41, a timer 42, a communication port 43, an input/output port 45, a central processing unit (CPU) 44, and an internal bus 46 to which these components are connected. Control devices provided in the control system 20 may basically have the same structure as the rendering control device 21.

The right headlamp module 31 and the left headlamp module 32 are connected to the input/output port 45.

The communication port 43 is connected to the vehicle network 26. The communication port 43 obtains information from the vehicle network 26, and outputs information output by the rendering control device 21 to the vehicle network 26.

The timer 42 measures time or clock time. The clock time of the timer 42 may be calibrated by the clock time of the GNSS receiver 36.

The memory 41 may include, for example, a semiconductor memory, a hard disk drive (HDD), random access memory (RAM), etc. The HDD is non-volatile memory. The RAM is volatile memory. The memory 41 records a program executed by the CPU 44 and various types of information used during execution of the program as data. The memory 41 may record, for example, data of the light projection patterns 60 illustrated in FIG. 1, and setting information including standard rendering positions and rendering sizes when rendering the light projection patterns 60 onto the road surface.

The CPU 44 reads and executes the program recorded in the memory 41. As a result, the CPU 44 serves as a controller of the rendering control device 21. In the present embodiment, the CPU 44 serves as a controller configured to control light projection for road surface image rendering by a light projection member.

The CPU 44 as the controller controls the operation of the rendering control device 21. The CPU 44 as the controller also outputs signals to the right headlamp module 31 and the left headlamp module 32 through the communication port 43. As a result, the CPU 44 as the controller controls the light projection modules 53 for road surface image rendering, which are provided in the right headlamp module 31 and the left headlamp module 32. The right headlamp module 31 and the left headlamp module 32 are illuminated with light projection patterns for road surface image rendering. On the road surface, for example, as illustrated in FIG. 1, the road surface images 11 corresponding to the light projection patterns 60 may be rendered. In FIG. 1, each road surface image 11 is rendered at a rendering position and in a rendering size that are easy to see from the driver who is facing forward.

Figure 3:
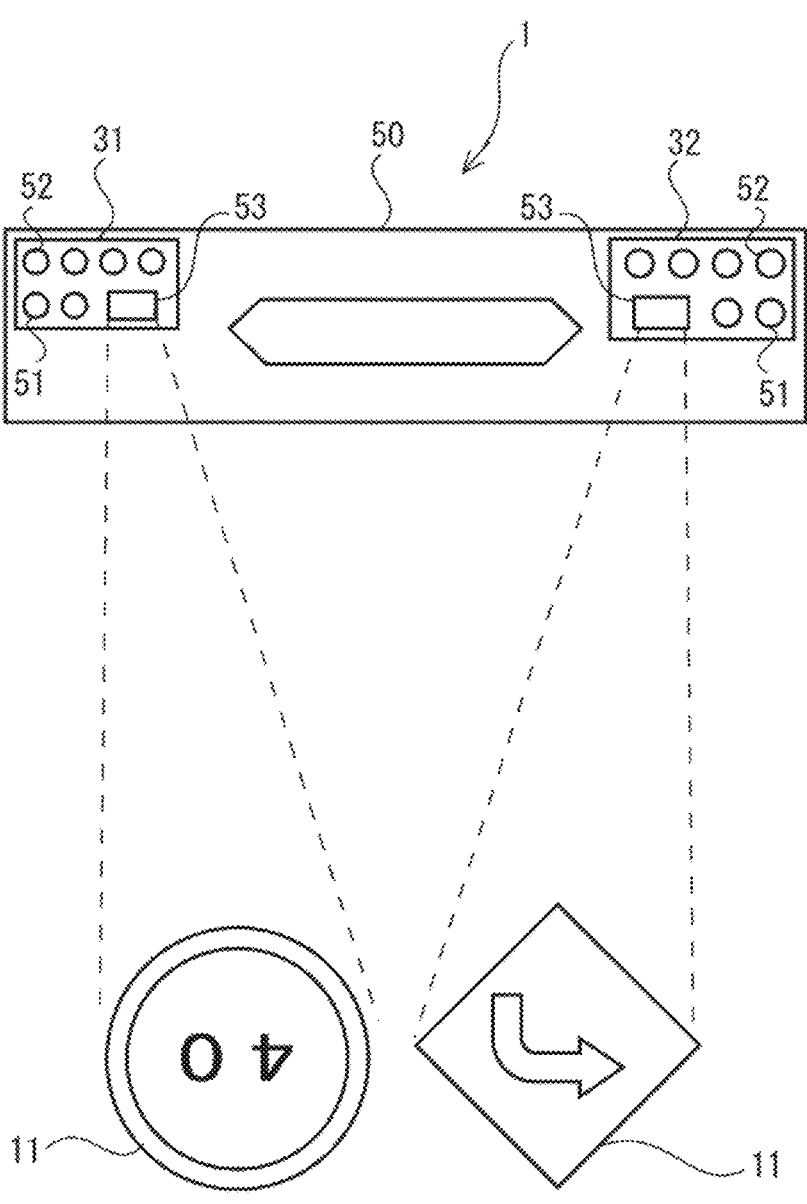
FIG. 3 is a schematic descriptive diagram of the structure and layout of a right headlamp module and a left headlamp module in the front end portion of the vehicle illustrated in FIG. 1.

FIG. 3 is a schematic descriptive diagram of the structure and layout of the right headlamp module 31 and the left headlamp module 32 in the front end portion 50 of the vehicle 1 illustrated in FIG. 1.

In FIG. 3, the front end portion 50 of the vehicle 1 is illustrated.

At the right end of the front end portion 50 of the vehicle 1, the right headlamp module 31 is provided. The right headlamp module 31 has light emitting diodes (LEDs) 51 for low beams, LEDs 52 for high beams, and the microelectromechanical systems (MEMS) light projection module 53.

At the left end of the front end portion 50 of the vehicle 1, the left headlamp module 32 is provided. The left headlamp module 32 has LEDs 51 for low beams, LEDs 52 for high beams, and the MEMS light projection module 53.

Note that the light projection modules 53 may alternatively be of the digital micromirror device (DMD) format, for example.

Each MEMS light projection module 53 may be, for example, one that projects light from a trichromatic light source by reflecting the light by a MEMS element. The MEMS element may be controlled by an image signal to adjust its reflection state.

The right headlamp module 31 or the left headlamp module 32 may also use something other than the MEMS light projection module 53 for rendering an image on the road surface.

Then, in FIG. 3, the MEMS light projection module 53 of the right headlamp module 31 projects light, which renders the speed-limit road surface image 11 corresponding to the speed-limit light projection pattern 62 on the road surface.

Also, the MEMS light projection module 53 of the left headlamp module 32 projects light, which renders the left-turn indicator road surface image 11 corresponding to the left-turn indicator light projection pattern 61 on the road surface.

Note that the MEMS light projection module 53 of the right headlamp module 31 and the MEMS light projection module 53 of the left headlamp module 32 may cooperate to render one large road surface image 11 on the road surface.

By controlling the MEMS light projection module 53 of the right headlamp module 31 and the MEMS light projection module 53 of the left headlamp module 32 according to the light projection pattern(s), the CPU 44 as the controller can render one or more road surface images 11 corresponding to one or more light projection patterns on the road surface.

As described above, the MEMS light projection module 53 of the right headlamp module 31 and the MEMS light projection module 53 of the left headlamp module 32 can serve as a light projection member configured to project light for the road surface images 11 according to the light projection patterns.

However, the road surface images 11 rendered on the road surface by light projection from the vehicle 1 as described above are not necessarily easily visually recognizable by the driver of the vehicle 1 or by others.

On the road where the vehicle 1 travels, there may be the pedestrian 3 and bicycles, as well as preceding vehicles and the oncoming vehicle 2. Moreover, the pedestrian 3 and bicycles are often on the road shoulder of the road rather than in the lanes of the road. It may be necessary for the driver of the vehicle 1 to pay more conscious attention to pedestrians and bicycles on the road shoulder of the road than to preceding and oncoming vehicles. Especially at night, the pedestrian 3 and bicycles on the road shoulder of the road may be difficult for the driver of the vehicle to see.

In such a traveling environment, if the vehicle 1 renders road surface images 11 on the road surface as usual, the driver of the vehicle 1 may become easily distracted by the road surface images 11 which are brightly rendered on the road surface. As a result, the driver of the vehicle 1 may pay attention to possible preceding vehicles, the oncoming vehicle 2, and the road surface images 11, which are easily recognizable, but may lack conscious attention to other things, such as the pedestrian 3 and bicycles on the road shoulder of the road.

Figure 4:
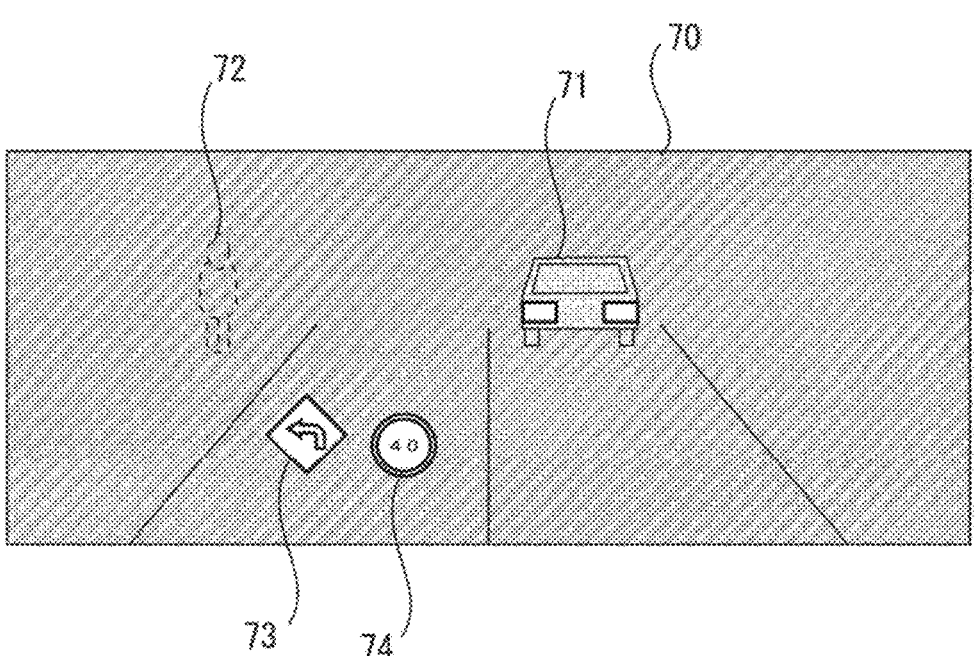
FIG. 4 is a descriptive diagram of an image captured by a vehicle exterior camera illustrated in FIG. 2.

FIG. 4 is a descriptive diagram of an image 70 captured by the vehicle exterior camera 35 illustrated in FIG. 2.

The captured image 70 illustrated in FIG. 4 is one captured by the vehicle exterior camera 35 of the vehicle 1 in the traveling state illustrated in FIG. 1.

Therefore, the captured image 70 illustrated in FIG. 4 includes an image 71 of the oncoming vehicle 2, an image 72 of the pedestrian 3, and detection images 73 and 74 of the road surface images 11, along with the road on which the vehicle 1 is traveling.

As described above, in the image 70 captured by the vehicle exterior camera 35, there are the image 71 of the oncoming vehicle 2 and the detection images 73 and 74 of the road surface images 11, which appear brightly.

In contrast, the image 72 of the pedestrian 3 on the road shoulder appears darkly as if it were buried in the surroundings.

The driver of the vehicle 1 will see the traveling environment similar to that illustrated in FIG. 4 from inside the vehicle 1. The driver may be easily distracted by the oncoming vehicle 2 and the road surface images 11. In addition, by visually recognizing and confirming many things and events such as the oncoming vehicle 2 and the road surface images 11, the driver may neglect conscious attention and a confirmation task for the pedestrian 3 and others on the road shoulder that are dark and difficult to see.

As described above, there is a demand for improved road surface image rendered from the vehicle 1.

Figure 5:
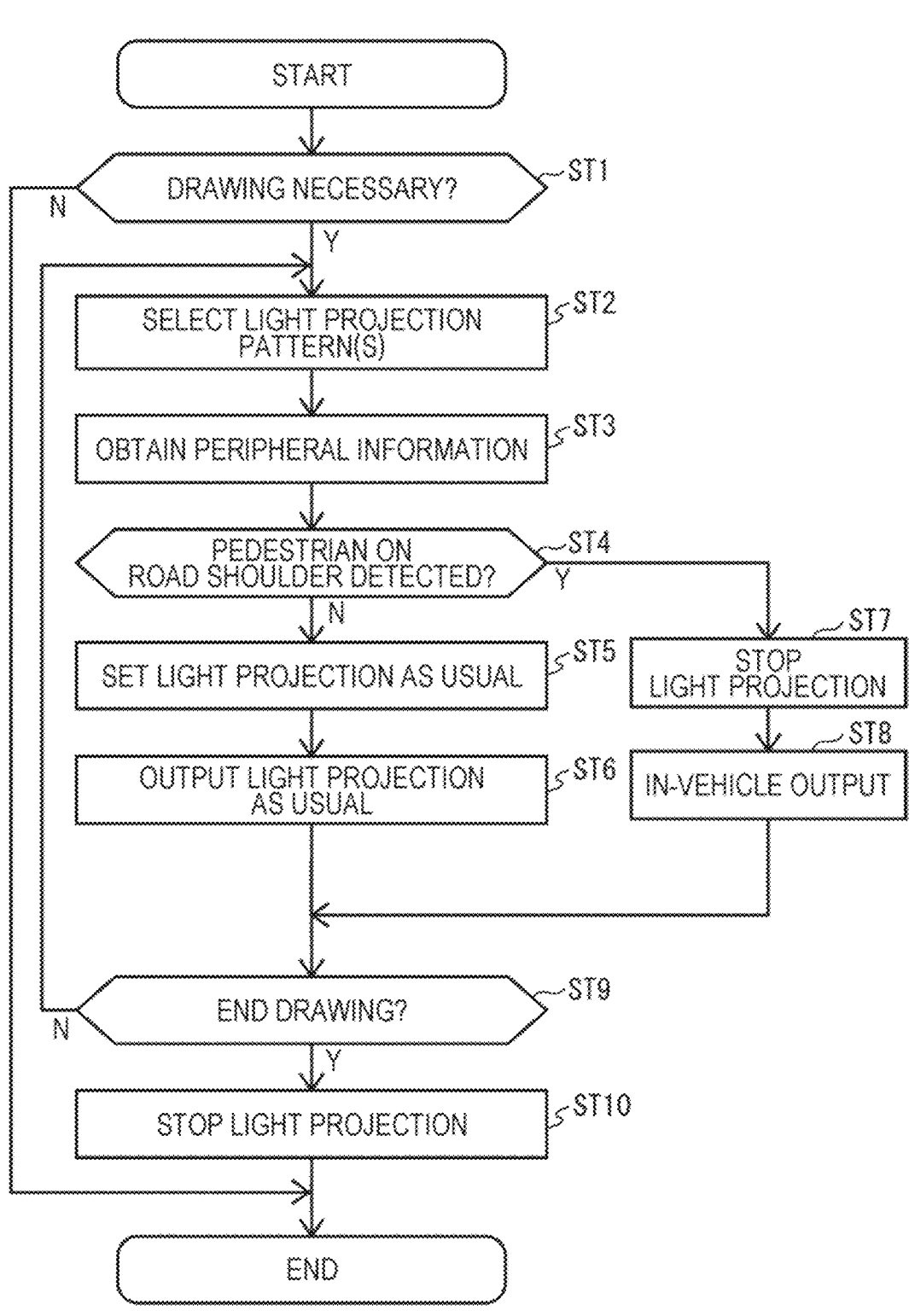
FIG. 5 is a flowchart of road surface image rendering control in the embodiment, executed by a rendering control device illustrated in FIG. 2.

FIG. 5 is a flowchart of road surface image rendering control in the first embodiment, executed by the rendering control device 21 illustrated in FIG. 2.

The CPU 44 as the controller of the rendering control device 21 repeatedly executes the road surface image rendering control illustrated in FIG. 5.

Note that, in the case where a rendering control function is implemented in the headlamp control device 22 in the control system 20, the CPU of the headlamp control device 22, as the controller, may repeatedly execute the road surface image rendering control illustrated in FIG. 5.

In step ST1, the CPU 44, which controls light projection for road surface image rendering, determines the necessity of road surface image rendering.

A request for road surface image rendering may be generated by various control devices in the control system 20. For example, in the case where the headlamp control device 22 is to cause the headlamps to be illuminated, the headlamp control device 22 may generate information requesting road surface image rendering and output it to the rendering control device 21 through the vehicle network 26. If there is a request for road surface image rendering, the CPU 44 advances the process to step ST2. If there is no request for road surface image rendering, the CPU 44 terminates this control.

In step ST2, the CPU 44 selects, based on the request for road surface image rendering, one or more light projection patterns to be used for road surface image rendering from among the light projection patterns 60 recorded in the memory 41. As illustrated in FIG. 1, the CPU 44 may select multiple light projection patterns or a single light projection pattern.

In step ST3, the CPU 44 obtains peripheral information of the vehicle 1.

Here, the CPU 44 may obtain spatial information in front of the vehicle 1 using the Lidar 34, and/or the captured image 70 in front of the vehicle 1 using the vehicle exterior camera 35.

The CPU 44 may also obtain non-illustrated high-precision map data recorded in the memory 41 or the like, along with the location information of the GNSS receiver 36.

In step ST4, the CPU 44 analyzes the peripheral information of the vehicle 1 obtained in step ST3 to determine whether there are pedestrians or bicycles on the road shoulder in front of the vehicle 1.

For example, as illustrated in FIG. 4, in the case where there is the pedestrian 3 on the road shoulder in front of the vehicle 1, the captured image 70 of the vehicle exterior camera 35 includes the image 72 of the pedestrian 3.

In the case where, as a result of the analysis of the peripheral information of the vehicle 1 obtained in step ST3, the captured image 70 of the vehicle exterior camera 35 includes the image 72 of the pedestrian 3, the CPU 44 may determine that there is a pedestrian or a bicycle on the road shoulder in front of the vehicle 1. In this case, the CPU 44 advances the process to step ST7.

In contrast, in the case where the captured image 70 of the vehicle exterior camera 35 includes no image 72 of the pedestrian 3, the CPU 44 determines that there is no pedestrian or bicycle on the road shoulder in front of the vehicle 1, and advances the process to step ST5.

From step ST5, the CPU 44 begins processing for rendering one or more light projection patterns selected in step ST2 onto the road surface as usual. The CPU 44 first obtains from the memory 41 setting information of the standard rendering position and rendering size when rendering the light projection pattern(s) 60 to the road surface, and sets them in the light projection modules 53.

In step ST6, the CPU 44 controls the light projection modules 53 as light projection members to start light projection from the light projection modules 53 for the selected one or more light projection patterns. As a result, the light projection modules 53 as the light projection members, under the normal light projection settings in step ST5, project the road surface images 11 onto the road surface at the usual positions and in the usual sizes.

As described above, in the case where no pedestrian 3 or bicycle on the road shoulder in front of the vehicle 1 is detected by the detection device, the CPU 44 can cause the light projection modules 53 to execute light projection for road surface image rendering to render the road surface image(s) 11 on the road surface in front of the vehicle 1.

The CPU 44 then advances the process to step ST9.

From step ST7, the CPU 44 starts light projection processing corresponding to the case where there is a pedestrian or a bicycle on the road shoulder in front of the vehicle 1. The CPU 44 first controls the light projection modules 53 as the light projection members to stop light projection from the light projection modules 53. This prevents the light projection modules 53 as the light projection members from projecting light onto the road surface for the one or more light projection patterns selected in step ST2. In response to detection of a pedestrian or a bicycle on the road shoulder in front of the vehicle 1 by the detection device, the CPU 44 can stop light projection for road surface image rendering by the light projection members, thereby preventing road surface images from being rendered on the road surface in front of the vehicle 1.

In step ST8, the CPU 44 displays information on the meter panel 33 that light projection for road surface image rendering by the light projection members is stopped.

As a result, in the case of stopping light projection for road surface image rendering by the light projection module 53 in response to detection of the pedestrian 3 or a bicycle on the road shoulder in front of the vehicle 1 by the detection device, the CPU 44 can output information from the information output device to an occupant of the vehicle 1 that the road surface image rendering is stopped.

The CPU 44 then advances the process to step ST9.

In step ST9, the CPU 44 determines whether to end the road surface image rendering. The CPU 44 may determine to end the road surface image rendering, for example, if there is no request for road surface image rendering. In this case, the CPU 44 advances the process to step ST10.

For example, if there remains a request for road surface image rendering, the CPU 44 determines not to end the road surface image rendering, and returns the process to step ST2. In this case, the CPU 44 repeats the processing from step ST2 to step ST9 to continue the road surface image rendering.

In step ST10, the CPU 44 controls the light projection modules 53 to stop the light projection for the road surface image(s) 11 from the light projection modules 53. As a result, the road surface image(s) 11 are no longer rendered on the road surface of the road.

As described above, in response to detection of the pedestrian 3 or a bicycle on the road shoulder in front of the vehicle 1 by the detection device, the CPU 44 as the controller can change the light projection for road surface image rendering by the light projection modules 53 so as to promote visual recognition of the pedestrian 3 or the bicycle on the road shoulder in front of the vehicle 1.

Figure 6:
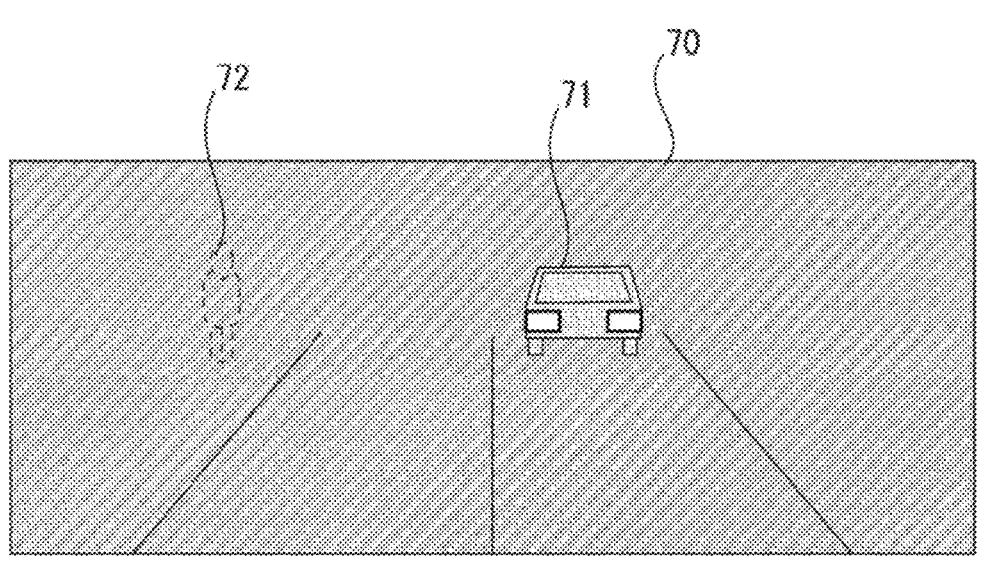
FIG. 6 is a descriptive diagram of an image captured by the vehicle exterior camera illustrated in FIG. 2, in a state where light projection is stopped in step ST7.

FIG. 6 is a descriptive diagram of the image 70 captured by the vehicle exterior camera 35 illustrated in FIG. 2, in a state where light projection is stopped in step ST7.

The captured image 70 illustrated in FIG. 6, unlike the captured image 70 illustrated in FIG. 4, includes the image 71 of the oncoming vehicle 2 and the image 72 of the pedestrian 3, along with the road on which the vehicle 1 is traveling. The captured image 70 does not include the detection images 73 and 74 of the road surface images 11.

The driver of the vehicle 1 will then see the traveling environment similar to that illustrated in FIG. 4 from inside the vehicle 1. The driver's consciousness becomes easier to turn to the pedestrian 3 on the road shoulder, as well as to the oncoming vehicle 2. The driver is able to pay conscious attention to and confirm the pedestrian 3 and others on the road shoulder that are dark and difficult to see, without seeing the road surface images 11.

Figure 7:
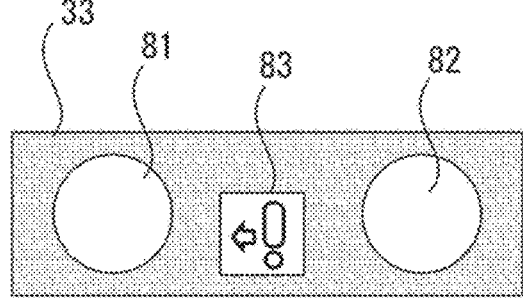
FIG. 7 is a descriptive diagram of a display state of a meter panel of the vehicle after the processing in step ST8.

FIG. 7 is a schematic diagram of the display state of the meter panel 33 of the vehicle 1 after the processing in step ST8.

The meter panel 33 illustrated in FIG. 7 is a horizontal rectangular liquid crystal panel. An image 81 of the tachometer is displayed in the left portion, and an image 82 of the speedometer is displayed in the right portion of the horizontal rectangular meter panel 33.

Then, after the processing in step ST8, an image 83 of the light projection pattern 66 with a pictogram to alert that there is a pedestrian or bicycle on the road shoulder is displayed in the central portion of the horizontal rectangular meter panel 33. Such display of the meter panel 33 allows the driver to be alerted to the presence of the pedestrian 3 or a bicycle on the road shoulder. Also, because the road surface image rendering is stopped at the same time, the driver can easily pay attention to and confirm the pedestrian 3 or a bicycle on the road shoulder when checking the front of the vehicle 1.

As described above, the vehicle 1 of the present embodiment has the detection device capable of detecting the pedestrian 3 or a bicycle on the road shoulder in front of the vehicle 1, where road surface images are rendered by the light projection modules 53. Then, the CPU 44, as a controller configured to control light projection for road surface image rendering by the light projection modules 53, is able to change, in response to detection of the pedestrian 3 or a bicycle on the road shoulder in front of the vehicle 1 by the detection device, light projection for road surface image rendering by the light projection members 53 so as to promote visual recognition of the pedestrian 3 or the bicycle on the road shoulder in front of the vehicle 1, rather than merely projecting light for road surface image rendering by the light projection members 53.

This makes it difficult for the driver of the vehicle 1 to be distracted by the road surface images 11 rendered on the road surface of the road, and makes it easier for the driver to pay attention to and visually recognize the pedestrian 3 and bicycles on the road shoulder in front of the vehicle, as well as preceding vehicles and the oncoming vehicle 3 in front of the vehicle 1. The driver of the vehicle 1 can pay attention to and visually recognize the pedestrian 3 and bicycles on the road shoulder in front of the vehicle 1, just as in the case where no road surface images 11 are rendered. As a result, even if the vehicle 1 is able to render the road surface images 11 on the road surface, it can be expected that the driver of the vehicle 1 will pay attention to the pedestrian 3 or bicycles on the road shoulder in front of the vehicle 1, just as in the case where no road surface images 11 are rendered. The driver is less likely to be distracted by the road surface images 11 and to overlook the pedestrian 3 and others on the road shoulder.

As described above, it can be expected in the present embodiment that light projection for road surface image rendering will be controlled to improve road surface image rendering from the vehicle 1.

Second Embodiment

Next, a road surface image rendering device of the vehicle 1 according to a second embodiment of the disclosure will be described.

In the present embodiment, light projection for road surface image rendering by the light projection modules 53 is changed in a different way than the above-described embodiment to promote visual recognition of the pedestrian 3 or a bicycle on the road shoulder in front of the vehicle 1.

Hereinafter, differences from the above-described embodiment will be described mainly.

Figure 8:
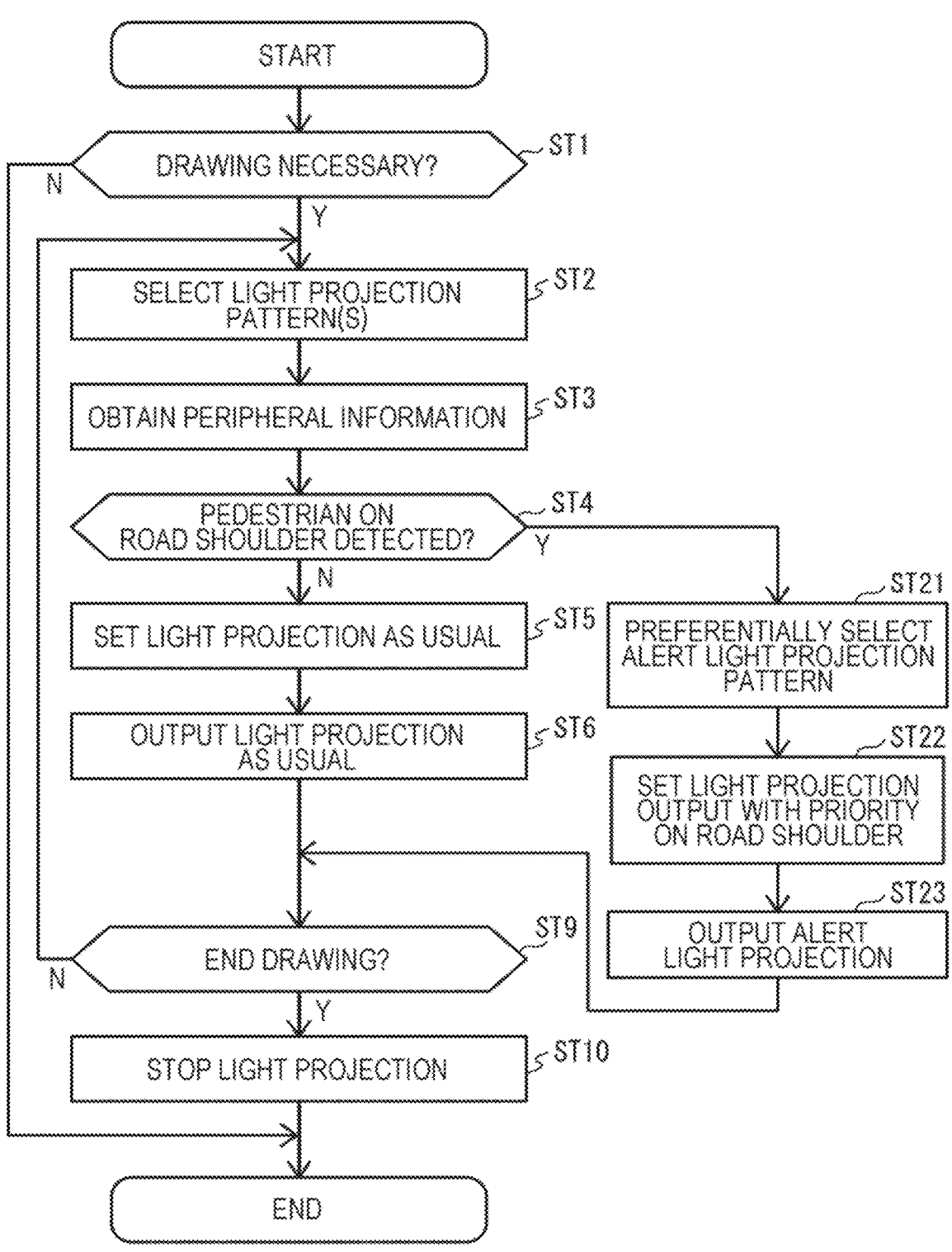
FIG. 8 is a flowchart of road surface image rendering control in an embodiment, executed by the rendering control device illustrated in FIG. 2.

FIG. 8 is a flowchart of road surface image rendering control in the second embodiment, executed by the rendering control device 21 illustrated in FIG. 2.

The CPU 44 as the controller of the rendering control device 21 repeatedly executes the road surface image rendering control illustrated in FIG. 8.

Note that, in the case where a rendering control function is implemented in the headlamp control device 22 in the control system 20, the CPU of the headlamp control device 22 may repeatedly execute the road surface image rendering control illustrated in FIG. 8.

Steps ST1 through ST4 are the same as those in the above-described embodiment.

However, if it is determined in step ST4 that the pedestrian 3 or a bicycle on the road shoulder is detected, the CPU 44 advances the process to step ST21.

The CPU 44 selects one or more light projection patterns to be projected by the light projection modules 53 for road surface image rendering, determines by the detection device whether the pedestrian 3 or a bicycle on the road shoulder in front of the vehicle 1 is detected, and if it is determined that the pedestrian 3 or a bicycle is detected, advances the process to step ST21.

In contrast, if the detection device does not detect the pedestrian 3 or a bicycle on the road shoulder in front of the vehicle 1, the CPU 44 advances the process to step ST5 for light projection as usual. The CPU 44 causes the selected light projection pattern(s) to be projected as usual from the light projection modules 53 in step ST6.

In step ST21, the CPU 44 preferentially selects, in addition to the light projection pattern(s) selected in step ST2, the light projection pattern 66 with a pictogram to alert that there is the pedestrian 3 or a bicycle on the road shoulder.

Note that, in the case where multiple light projection patterns are selected in step ST2, the CPU 44 may replace one of these patterns with the light projection pattern 66 with a pictogram to alert that there is the pedestrian 3 or a bicycle on the road shoulder. This can prevent an increase in the number of road surface images 11 in the traveling environment where there is the pedestrian 3 or a bicycle on the road shoulder. The CPU 44 may set the maximum number of concurrently-rendered road surface images 11 to two, for example, and, while preferentially selecting the light projection pattern 66 to alert that there is the pedestrian 3 or a bicycle, the CPU 44 may reselect a light projection pattern to ensure that the road surface images 11 stay within the maximum number.

Alternatively, the CPU 44 may select the light projection pattern 66 with a pictogram alone to alert that there is the pedestrian 3 or a bicycle on the road shoulder, instead of the light projection pattern(s) selected in step ST2.

In step ST22, the CPU 44 starts processing for rendering onto the road surface the one or more light projection patterns selected as a result of the processing in step ST21.

At this time, the CPU 44 may first obtain setting information of the standard rendering position and rendering size when rendering the light projection pattern(s) 60 on the road surface from the memory 41, change them, and set them in the light projection modules 53.

In particular, if multiple light projection patterns are selected as a result of the processing in step ST21, the CPU 44 may execute settings that are changed in order to make the light projection pattern 66 indicating that there is a detected pedestrian or bicycle more visible than other light projection patterns.

In step ST23, the CPU 44 controls the light projection modules 53 as the light projection members to start light projection from the light projection modules 53 for the selected one or more light projection patterns. As a result, the light projection modules 53 as the light projection members project the one or more road surface images 11 onto the road surface under the light projection output settings with priority on the road shoulder in step ST22.

As described above, in response to detection of the pedestrian 3 or a bicycle on the road shoulder in front of the vehicle 1 by the detection device, the CPU 44 can cause, instead of the light projection pattern(s) selected in step ST2 or in addition to the light projection pattern(s) selected in step ST2, the light projection pattern 66 indicating that there is the detected pedestrian 3 or bicycle to be preferentially light-projected from the light projection modules 53.

The CPU 44 then advances the process to step ST9.

Figure 9:
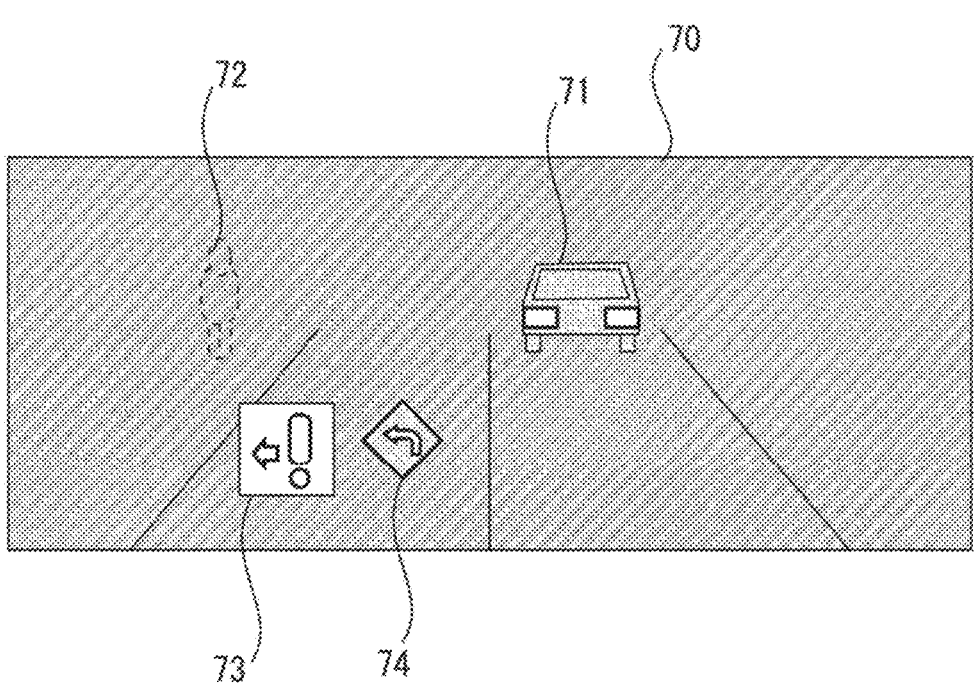
FIG. 9 is a descriptive diagram of an image captured by the vehicle exterior camera illustrated in FIG. 2, in a light projection state in step ST23.

FIG. 9 is a descriptive diagram of the image 70 captured by the vehicle exterior camera 35 illustrated in FIG. 2 in a light projection state in step ST23.

The captured image 70 illustrated in FIG. 9, unlike the captured image 70 illustrated in FIG. 6, includes the detection images 73 and 74 of the road surface images 11, along with the road on which the vehicle 1 is traveling, the image 71 of the oncoming vehicle 2, and the image 72 of the pedestrian 3.

However, unlike the captured image 70 illustrated in FIG. 4, the detection image 73 of the road surface image 11 on the road shoulder side has been changed to one based on the light projection pattern 66 indicating that there is the pedestrian 3 or a bicycle on the road shoulder.

Also, the detection image 74 of the road surface image 11 on the middle side of the road has been changed from one based on the speed-limit light projection pattern 62 in the captured image 70 illustrated in FIG. 4 to one based on the left-turn indicator light projection pattern 61.

Furthermore, the detection image 73 of the road surface image 11 on the road shoulder side is projected with a relatively larger size in comparison to the detection image 74 of the road surface image 11 on the middle side of the road according to the light projection output settings with priority on the road shoulder in step ST22. In addition, the detection image 74 of the road surface image 11 on the middle side of the road is projected to be darker with reduced brightness in comparison to the detection image 73 of the road surface image 11 on the road shoulder side according to the light projection output settings with priority on the road shoulder in step ST22. The road surface image 11 on the middle side of the road is projected in a suppressed state with reduced brightness and in a relatively reduced size in comparison to the light projection pattern 66 indicating that there is the detected pedestrian 3 or bicycle.

This allows the driver to be alerted to the presence of the pedestrian 3 or a bicycle on the road shoulder without paying special attention to the road shoulder by themselves.

The driver of the vehicle 1 will see the traveling environment similar to that illustrated in FIG. 9 from inside the vehicle 1. The driver's consciousness becomes easier to turn to the pedestrian 3 on the road shoulder, as well as to the oncoming vehicle 2. Even if the driver visually recognizes the road surface images 11, the driver can, by being alerted thereby, pay conscious attention to and confirm the pedestrian 3 and others on the road shoulder that are dark and difficult to see. The driver is less likely to be distracted by the road surface images 11 and to overlook the pedestrian 3 and others on the road shoulder.

While the above embodiments are examples of embodiments suitable for the disclosure, the disclosure is not limited thereto, and various modifications or changes can be made without departing from the spirit of the disclosure.

In the above-described embodiments, each light projection module 53 as the light projection member is provided in the right headlamp module 31 or the left headlamp module 32 in the vehicle 1, integrated with the LEDs 51 or 52 for the headlamps.

Alternatively, for example, each light projection module 53 as the light projection member may be provided as a separate body from the right headlamp module 31 or the left headlamp module 32 in the vehicle 1.

Moreover, one light projection module 53 may be provided in the vehicle 1, or three or more light projection modules 53 may be provided in the vehicle 1. One light projection module 53 or a third light projection module 53 may be provided in the widthwise center on the front of the vehicle.

A vehicle of the disclosure includes a detection device capable of detecting a pedestrian or a bicycle on a road shoulder in front of the vehicle, where a road surface image is rendered by a light projection member. Then, a controller configured to control light projection for road surface image rendering by the light projection member changes, in response to detection of a pedestrian or a bicycle on the road shoulder in front of the vehicle by the detection device, light projection for road surface image rendering by the light projection member so as to promote visual recognition of the pedestrian or the bicycle on the road shoulder in front of the vehicle, rather than merely projecting light for road surface image rendering by the light projection member.

This makes it difficult for the driver of the vehicle to be distracted by road surface images rendered on the road surface of the road, and makes it easier for the driver of the vehicle to pay attention to and visually recognize pedestrians and bicycles on the road shoulder in front of the vehicle, as well as preceding and oncoming vehicles in front of the vehicle. The driver of the vehicle can pay attention to and visually recognize pedestrians and bicycles on the road shoulder in front of the vehicle, just as in the case where no road surface images are rendered. As a result, even if the vehicle is able to render road surface images on the road surface, it can be expected that the driver of the vehicle will pay attention to pedestrians or bicycles on the road shoulder in front of the vehicle, just as in the case where no road surface images are rendered.

As described above, it can be expected in the disclosure that light projection for road surface image rendering will be controlled to improve road surface image rendering from the vehicle.

The CPU 44 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the CPU 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle configured to render a road surface image on a road surface of a road on which the vehicle is traveling, the vehicle comprising:

a light projection member configured to project a visual notification image onto the road surface in front of the vehicle for rendering the road surface image;

a controller configured to control light projection by the light projection member for rendering the road surface image while the vehicle is traveling; and a detection device configured to perform real-time detection of a pedestrian or a bicycle physically present on a road shoulder located in front of the vehicle and adjacent to the road on which the vehicle is traveling, while rendering the road surface image, wherein the controller is configured to, in response to the real-time detection of the pedestrian or the bicycle on the road shoulder by the detection device while the vehicle is traveling and rendering the road surface image, modify at least one of a projection pattern, brightness, or shape of the light projection by the light projection member so as to enhance visual recognizability of the detected pedestrian or the detected bicycle to a driver of the vehicle.

2. The vehicle with the road surface image rendering function according to claim 1, wherein the controller is configured to:

when the pedestrian or the bicycle on the road shoulder in front of the vehicle is detected by the detection device, stop the light projection for the road surface image rendering by the light projection member, thereby preventing the road surface image from being rendered on the road surface in front of the vehicle, and when the pedestrian or the bicycle on the road shoulder in front of the vehicle is not detected by the detection device, cause the light projection member to project the light for the road surface image rendering, thereby rendering the road surface image on the road surface in front of the vehicle.

3. A vehicle configured to render a road surface image on a road surface of a road on which the vehicle is traveling, the vehicle comprising:

a light projection member configured to project light toward the road surface in front of the vehicle for rendering the road surface image;

a controller configured to control light projection by the light projection member for rendering the road surface image;

a detection device configured to perform real-time detection of a pedestrian or a bicycle physically present on a road shoulder located in front of the vehicle and adjacent to the road on which the vehicle is traveling, while rendering the road surface image; and an information output device provided in the vehicle, the information output device being configured to output information to an occupant of the vehicle, wherein the controller is configured to, in response to the real-time detection of the pedestrian or the bicycle on the road shoulder by the detection device, modify at least one of a projection pattern, brightness, or shape of the light projection by the light projection member so as to enhance visual recognizability of the detected pedestrian or the detected bicycle to a driver of the vehicle, wherein the controller is further configured to:

when the pedestrian or the bicycle on the road shoulder in front of the vehicle is detected by the detection device, stop the light projection for the road surface image rendering by the light projection member, thereby preventing the road surface image from being rendered on the road surface in front of the vehicle; and when the pedestrian or the bicycle on the road shoulder in front of the vehicle is not detected by the detection device, cause the light projection member to project the light for the road surface image rendering, thereby rendering the road surface image on the road surface in front of the vehicle, and wherein the controller is configured to, upon stopping the light projection for the road surface image rendering by the light projection member when the pedestrian or the bicycle on the road shoulder in front of the vehicle is detected by the detection device, output from the information output device to the occupant of the vehicle the information that indicates the road surface image rendering is stopped.

4. The vehicle with the road surface image rendering function according to claim 1, wherein the controller is configured to:

select a first light projection pattern to be light-projected by the light projection member for the road surface image rendering, and determine whether the pedestrian or the bicycle on the road shoulder in front of the vehicle is detected by the detection device;

when the pedestrian or the bicycle on the road shoulder in front of the vehicle is detected by the detection device, cause the light projection member to project a second light projection pattern indicating that there is the detected pedestrian or bicycle, instead of the first light projection pattern or in addition to the first light projection pattern; and when the pedestrian or the bicycle on the road shoulder in front of the vehicle is not detected by the detection device, cause the light projection member to project the first light projection pattern.

5. The vehicle with the road surface image rendering function according to claim 4, wherein the controller is configured to:

when the pedestrian or the bicycle on the road shoulder in front of the vehicle is detected by the detection device, suppress the light projection from the light projection member for a light projection pattern other than the second light projection pattern indicating that there is the detected pedestrian or bicycle, in comparison to the second light projection pattern.

6. A vehicle configured to render a road surface image on a road surface of a road on which the vehicle is traveling, the vehicle comprising:

a light projection member including a light source and configured to project a visual notification image onto the road surface in front of the vehicle for rendering a road surface image;

circuitry configured to control light projection by the light projection member for rendering the road surface image while the vehicle is traveling; and a detection device including a sensor and configured to perform real-time detection of a pedestrian or a bicycle physically present on a road shoulder located in front of the vehicle and adjacent to the road on which the vehicle is traveling, while rendering the road surface image, wherein the circuitry is configured to, in response to the real-time detection of the pedestrian or the bicycle on the road shoulder by the detection device while the vehicle is traveling and rendering the road surface image, modify at least one of a projection pattern, brightness, or shape of the light projection by the light projection member so as to enhance visual recognizability of the detected pedestrian or the detected bicycle to a driver of the vehicle.

* * * * *